(No Model.) 2 Sheets—Sheet 1.
J. B. VERNAY.
APPARATUS FOR THE MANUFACTURE OF BOTTLES OR OTHER GLASS ARTICLES.
No. 523,607. Patented July 24, 1894.
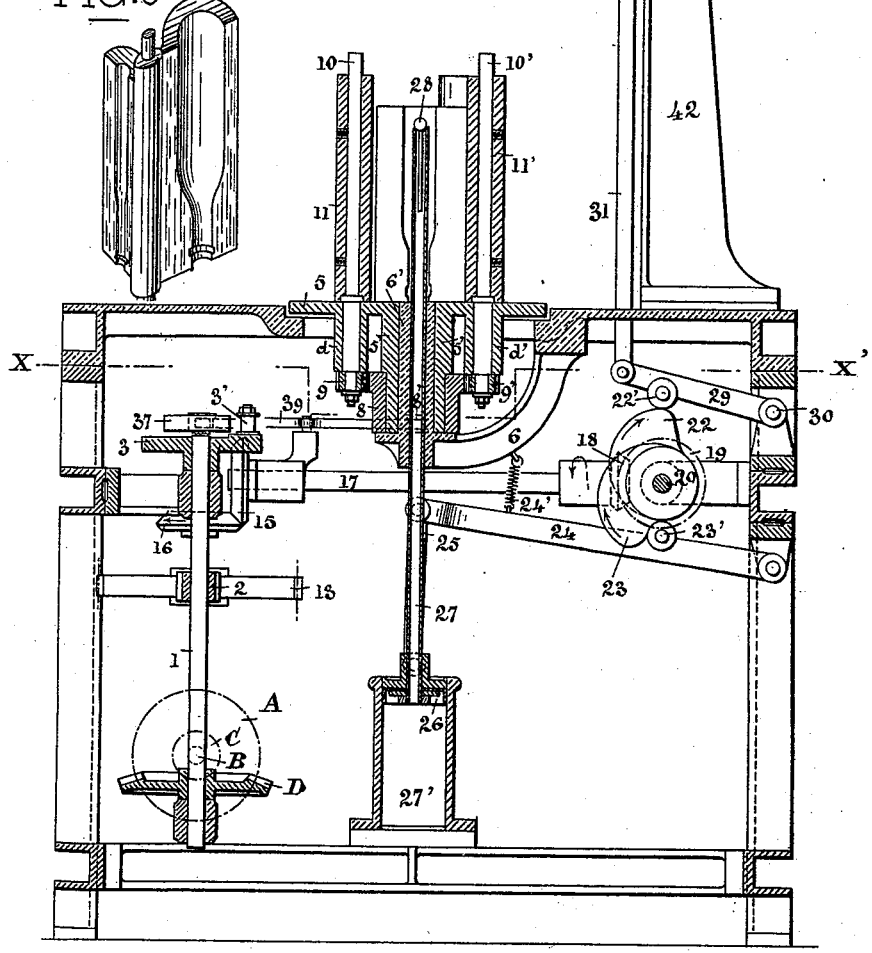
Witnesses:
G. W. Rea.
J. A. Saul.
Inventor,
Jean Baptiste Vernay,
By James L. Norris.
Atty (No Model.) 2 Sheets—Sheet 2.
J. B. VERNAY.
APPARATUS FOR THE MANUFACTURE OF BOTTLES OR OTHER GLASS ARTICLES.
No. 523,607. Patented July 24, 1894.
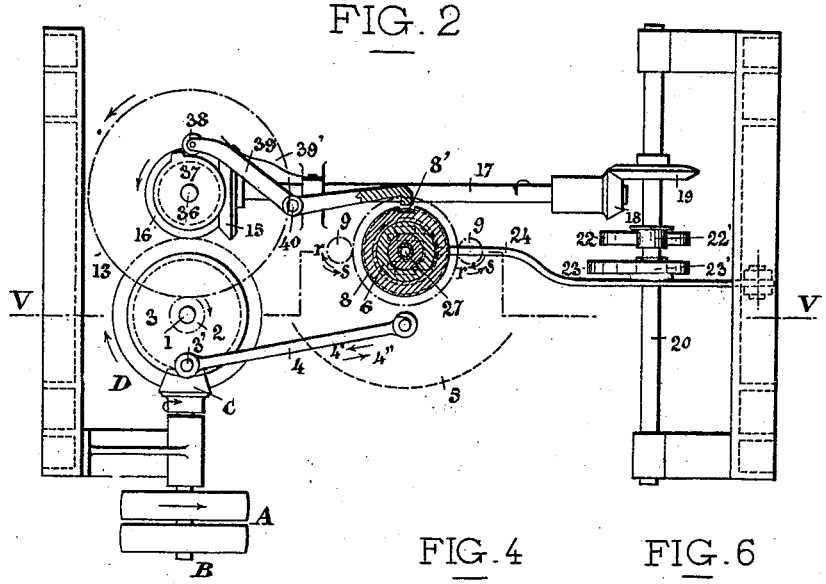
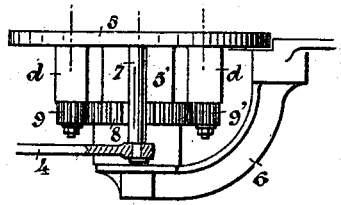
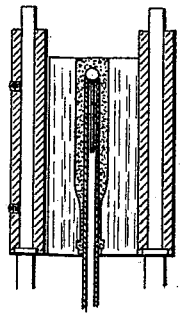
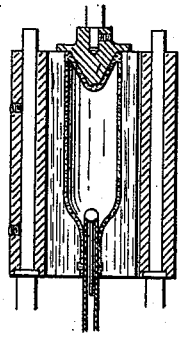
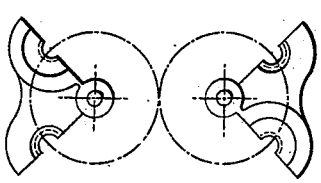
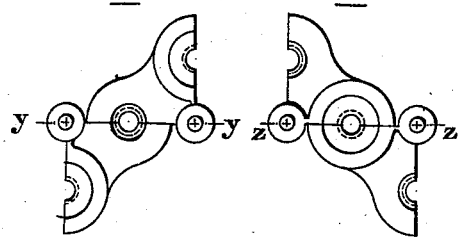
Witnesses:
G. W. Rea.
J. A. Saul.
Inventor:
Jean Baptiste Vernay
By James L. Norris.
Atty

UNITED STATES PATENT OFFICE.

JEAN BAPTISTE VERNAY, OF LYONS, FRANCE.

APPARATUS FOR THE MANUFACTURE OF BOTTLES OR OTHER GLASS ARTICLES.

SPECIFICATION forming part of Letters Patent No. 523,607, dated July 24, 1894.

Application filed October 24, 1893. Serial No. 489,058. (No model.) Patented in France July 1, 1893, No. 231,129.

*To all whom it may concern:*

Be it known that I, JEAN BAPTISTE VERNAY, manufacturer, a citizen of the Republic of France, and a resident of 31 Rue de l'Hôtel-de-Ville, Lyons, in the Republic of France, have invented certain new and useful Improvements Relating to Apparatus for the Manufacture of Bottles and other Glass Articles, (for which I have obtained a patent in France, No. 231,129, bearing date July 1, 1893,) of which the following is a specification, reference being had to the accompanying drawings.

This invention relates to the manufacture of bottles and other glass articles and to apparatus therefor. It is based upon the employment of mechanical means which are set in motion by a number of devices and the whole of which forms the apparatus herein-after set forth.

In order that my invention may be properly understood I will proceed to describe the apparatus as I prefer to construct the same for the manufacture of glass bottles.

Referring to the accompanying drawings, Figure 1 represents a vertical section of the apparatus on the line V—V of Fig. 2. Fig. 2 is a sectional plan of the said apparatus, showing in dotted lines the various parts situated below the sectional line X—X of Fig. 1. Fig. 3 is an elevation showing more particularly the bottom plate of the molds and the mode in which it is actuated. Fig. 4 is a vertical section taken on the line Y—Y of Fig. 5 and representing the glass poured into the so-called lump mold. Fig. 5 shows a plan of this lump mold. Fig. 6 is a vertical section taken on the line Z—Z, of Fig. 7 and representing the bottle just produced in the so-called final mold. Fig. 7 shows a plan of this final mold. Figs. 8 and 9 are perspective views showing more particularly half the lump mold and half the final mold. Fig. 10 is a plan of the parts 11 and 11', the union of which constitutes alternately either the lump mold or the final mold, and shows the position occupied by these parts when a bottle has just been made and when they are separated for enabling a bottle to be removed.

The principal parts of the improved apparatus are the mold, the part designed to make the bottom of the bottle, and the air pump.

I make the mold of two parts 11 and 11' which have the form of triangular prisms and are adapted to turn upon one of their edges. On each of the two faces adjoining this edge the said parts have cavities corresponding on one side to half a lump mold, and on the other side to half a final mold. By turning them upon their axes these two parts 11 and 11' can therefore be caused to join each other exactly to form either the lump mold Figs. 1, 4, and 5, or the final mold, Figs. 6 and 7.

The part 35 designed to make the bottom of the bottle has the form of an inverted cone; it may at a given moment be applied to the upper part of the mold and thus complete the final exterior shape of the bottle. It will be understood that if the bottom of the bottle is to be flat the aforesaid conical part is replaced by a disk which bears upon the upper part of the mold.

The air pump comprises a vertical cylinder 27' in which a piston 26 is fitted to move; the rod 27 of this piston is hollow and extends with its upper part into the mold. The lower orifice of this rod opens into the cylinder 27' while the upper orifice is closed by a small ball valve 28 provided with a guide rod.

These several parts perform a series of movements communicated to them by means of the mechanical devices hereinafter referred to.

The improved apparatus is actuated by means of fixed and loose pulleys A carried by a horizontal shaft B. This shaft B carries a bevel pinion C which operates a bevel wheel D upon a vertical shaft 1 to which a pinion 2 and a crank disk 3 are fixed. The before-mentioned pinion 2 actuates by a toothed wheel 13 a vertical shaft 36 upon which it is secured. On this shaft are also mounted a bevel pinion 16 and a cam 37. The bevel pinion 16 gearing with another pinion 15 causes the rotation of an intermediate shaft 17 carrying at its opposite extremity a pinion 18 which imparts movement to the second horizontal shaft 20 through the medium of a bevel wheel 19. Upon this shaft 20 are fixed two cams 22 and 23. The cam 22 operates the conical part 35 by means of its rod 34 which is adapted to slide in a socket 41 of a support 42 and is actuated by the levers 32 31, 29, the latter being provided with a friction roller 22'; while the cam 23 operates the piston of the pump through the intervention of two rods 24 and 25, the rod 24 being provided with a friction roller 23'.

I fix the two parts 11 and 11' of the mold upon axes 10 and 10' which turn freely at their lower end in sockets *d d'* cast in one piece with the bottom plate 5 upon which the molds are displaced. To the extremity of these axes 10 and 10' are keyed the two pinions 9 and 9' which engage with a toothed wheel 8 mounted loosely upon a shoulder 5' on the under side of the said bottom plate 5. This toothed wheel 8 has a long nave in which a cavity 8' is provided. The bottom plate 5 has moreover a rod 7, Fig. 3, which, being connected with the crank disk 3 by the rod 4, communicates to the said bottom plate an alternating circular movement. A cam 37 moves a two armed lever 39 articulated at 40 and one of the extremities of which is bent so as to be able to enter the cavity 8' in the nave of the aforesaid toothed wheel.

The operation of this apparatus may be divided into four very distinct periods.

First period. As soon as the apparatus is set in operation, the lump mold being in the position shown in Figs. 1 and 4, the workman pours into it the molten glass which he has collected by the aid of a scoop, or which is conducted into the said mold in any other suitable manner; the glass flows along the rod 27 and fills the cavity exactly, molding the collar and the neck of the bottle. During this time the crank disk 3 performs a certain number of revolutions each of which causes two oscillations of the bottom plate, 5, one in the direction of the arrow 4' and the other in the direction of the arrow 4'' Fig. 2, thereby turning also the whole of the molds 11 and 11', the pinions 9 9' and the toothed wheel 8 gearing with these pinions and mounted loosely upon its axis. The first period corresponds to five revolutions of the crank disk 3, that is to say to ten oscillations of the bottom plate 5. The part played by these oscillations consists in producing a frictional action of the mold upon the glass, which not only smooths the outer surface of the bottle but obviates the ridges which would otherwise be produced in the glass by the junction lines of the two parts of the mold.

Second period. This corresponds to the first half of the sixth revolution of the cam disk 3 and to the eleventh oscillation of the bottom plate 5. The sizes of the toothed wheels 2 and 13 are such that the cam disk 3 makes eleven revolutions while the cam 37 makes two. Now, from the commencement of this eleventh oscillation the cam 37 actuates the stop lever 39 provided with a tooth which enters the cavity 8' in the nave of the toothed wheel 8 and renders the latter stationary. Suppose this eleventh oscillation to take place in the direction of the arrow 4'. The two pinions 9 and 9' carried away by the oscillatory movement and gearing with the toothed wheel 8 are obliged to roll upon the latter, which causes the axes 10 and 10' of the mold to turn so as to open this mold. The sizes of the toothed wheels 9 9' and 8 are such that the two parts of the mold will describe upon their respective centers arcs of two hundred and seventy degrees, thereby replacing the lump mold, Figs. 4 and 5 by the final mold, Figs. 6 and 7.

Third period. This commences with the twelfth oscillation; the cam 37 discontinuing to act upon the stop lever 39 the latter is moved back by a spring 39' and its tooth leaves the aforesaid cavity 8' in the toothed wheel 8, so that the latter becomes loose again and is once more carried away by the oscillatory movement as during the first period. From the commencement of this third period two other parts intervene, namely in the first place the conical part 35 which is applied to the mold, being actuated through the medium of the rods and levers 29, 31, 32 and 34 by the cam 22, Fig. 1; and in the second place the cam 23 which by means of the levers 24 and 25, causes the hollow piston rod 27 and the piston 26 to descend, so that this piston will compress the air contained in the pump cylinder 27'; this air raises the small valve 28 and effects the blowing of the bottle. This period, like the first, corresponds to five revolutions of the crank disk and to ten oscillations of the bottom plate 5. At the end of this period the bottle is finished.

Fourth period. At the beginning of the fourth period, which commences with the twenty-second oscillation, which latter takes place in the direction of the arrow 4'', the cam 37 has again acted upon the stop lever 39 the extremity of which has passed into the cavity 8', in the nave of the wheel 8 thus stopping the latter, as however the direction of the oscillation is not the same as before the pinions 9 and 9' roll in the direction of the arrow *s* so as to cause the opening of the mold. In the course of this movement, the molds being in the position indicated in Fig. 10, the apparatus is suddenly thrown out of gear for a few seconds for enabling the workman to remove the bottle which has been finished; then the apparatus is again set in motion, the movements commenced terminate and the lump mold takes the place of the final mold; during this time the springs 24', 43 and 39' have moved back the parts to their original position and the apparatus is again ready for the first period.

For obviating the adherence of the glass to the mold use may be made either of oil, wax, resin or other substance suitable for preventing such adherence.

What I claim is—

1. In apparatus for manufacturing bottles and other hollow glass articles, a reversible mold composed of two automatically operated parts that are each provided in two adjacent faces with cavities corresponding on one face to half a lump mold and on the other face to half a final mold, whereby the said parts may be turned into different positions to cause their opposite coacting faces to form, first, the lump mold and then the final mold, substantially as described.

2. In apparatus for manufacturing bottles and other hollow glass articles, the combination with a reversible mold composed of pivotally supported parts each provided on opposite faces with cavities corresponding on one side to half a lump mold and on the other side to half a final mold, of an automatically movable part adapted to be applied to one end of the final mold in completing the bottom of the bottle or other hollow article, substantially as described.

3. In apparatus for manufacturing bottles and other hollow glass articles, the combination of an inverted mold, a vertically reciprocating part supported above said mold and adapted to coact therewith in completing the bottom of the bottle or other hollow article to be made, and an air pump arranged below the mold and comprising a cylinder, a piston and a hollow piston rod communicating with the cylinder and having its upper end extended into the mold and provided with an automatic valve, substantially as described.

In testimony whereof I have hereunto signed my name in the presence of two subscribing witnesses.

JEAN BAPTISTE VERNAY.

Witnesses:
JOSEPH HOURS,
JEAN GERMOUN.